US010870236B2

(12) United States Patent
Wu (10) Patent No.: US 10,870,236 B2
(45) Date of Patent: Dec. 22, 2020

(54) PRINTING MODULE AND THREE DIMENSIONAL PRINTING APPARATUS

(71) Applicants: XYZprinting, Inc., Taipei (TW); Kinpo Electronics, Inc., Taipei (TW)

(72) Inventor: Chi-Chieh Wu, Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 30 days.

(21) Appl. No.: 15/871,013

(22) Filed: Jan. 14, 2018

(65) Prior Publication Data
US 2019/0184636 A1  Jun. 20, 2019

(30) Foreign Application Priority Data

Dec. 14, 2017  (CN) .......................... 2017 1 1335007

(51) Int. Cl.
*B29C 64/245* (2017.01)
*B33Y 30/00* (2015.01)
(Continued)

(52) U.S. Cl.
CPC .......... *B29C 64/245* (2017.08); *B29C 64/209* (2017.08); *B29C 64/227* (2017.08);
(Continued)

(58) Field of Classification Search
CPC ... B29C 64/245; B29C 64/118; B29C 64/209; B29C 64/259; B29C 67/00; B29C 67/0051; B23Q 1/01; B23Q 3/155; B29L 2009/00
See application file for complete search history.

(56) References Cited

U.S. PATENT DOCUMENTS 8,752,922 B2 *  6/2014  Lamontagne ......... G06F 3/1225
                                                      347/3
2012/0162314 A1  6/2012  Swanson et al.
(Continued)

FOREIGN PATENT DOCUMENTS

DE    102016108351    11/2016
EP       3020536       5/2016
(Continued)

OTHER PUBLICATIONS

"Search Report of Europe Counterpart Application", dated Nov. 14, 2018, p. 1-p. 10.
(Continued)

*Primary Examiner* — Matthew J Daniels
*Assistant Examiner* — Shibin Liang
(74) *Attorney, Agent, or Firm* — JCIPRNET (57) ABSTRACT

A printing module and a 3D printing apparatus including a frame having a printing area and a standby area and a control module are provided. The printing module includes a carriage assembly disposed on the frame and electrically connected to the control module, a first base disposed on the carriage assembly and having a first latch movably disposed along a first axial direction, a fixing frame disposed in the standby area and having a first stopping portion and a second stopping portion arranged along the first axial direction, a second base movably disposed in the standby area along the first axial direction and located between the first stopping portion and the second stopping portion and having a second latch movably disposed along the first axial direction, and a printing head assembly having a first latching portion and a second latching portion disposed along a second axial direction.

12 Claims, 11 Drawing Sheets

(51) Int. Cl.
  *B33Y 40/00* (2020.01)
  *B29C 64/209* (2017.01)
  *B29C 64/227* (2017.01)
  *B29C 64/30* (2017.01)
  *B29C 64/393* (2017.01)
  *B29C 64/25* (2017.01)

(52) U.S. Cl.
  CPC .............. *B29C 64/25* (2017.08); *B29C 64/30* (2017.08); *B29C 64/393* (2017.08); *B33Y 30/00* (2014.12); *B33Y 40/00* (2014.12)

(56) References Cited

U.S. PATENT DOCUMENTS

| | | | | |
|---|---|---|---|---|
| 2015/0137401 | A1* | 5/2015 | Comb | B23Q 3/155 264/39 |
| 2017/0246801 | A1* | 8/2017 | Stodder | B33Y 30/00 |
| 2019/0047099 | A1* | 2/2019 | Guo | B23Q 1/015 |

FOREIGN PATENT DOCUMENTS

| | | | | |
|---|---|---|---|---|
| JP | 2018132913 | | 8/2018 | |
| WO | WO-2012088253 A1 * | | 6/2012 | ............ B33Y 30/00 |
| WO | 2014190168 | | 11/2014 | |
| WO | WO-2016057028 A1 * | | 4/2016 | ............ B33Y 30/00 |
| WO | 2017132767 | | 8/2017 | |
| WO | WO-2017132767 A1 * | | 8/2017 | ............ B23Q 1/015 |

OTHER PUBLICATIONS

"Office Action of Japan Counterpart Application," dated Aug. 27, 2019, p. 1-p. 7.

* cited by examiner

PRINTING MODULE AND THREE DIMENSIONAL PRINTING APPARATUS

CROSS-REFERENCE TO RELATED APPLICATION

This application claims the priority benefit of China application Ser. No. 201711335007.9, filed on Dec. 14, 2017. The entirety of the above-mentioned patent application is hereby incorporated by reference herein and made a part of this specification.

BACKGROUND

Technical Field

The disclosure is related to a printing module and a three-dimensional (3D) printing apparatus.

Description of Related Art

As the technology advanced in recent years, many methods that utilize additive manufacturing technology (e.g. layer-by-layer model construction) to build three-dimensional (3D) physical models have been proposed. Typically, the additive manufacturing technology is to convert data of a 3D model, which is constructed by software, such as computer aided design (CAD), into multiple thin (quasi-two-dimensional) cross-sectional layers that are stacked in sequence.

Currently, many techniques for forming thin cross-sectional layers are also proposed. For example, based on the information of each cross-sectional layers, a forming material is sprayed or extruded on a platform to be hardened to form the cross-sectional layers, and a 3D object can be formed after the cross-sectional layers are stacked layer by layer. In addition, a printing apparatus may be further equipped with a coloring nozzle to put color on the cross-sectional layers or the 3D object in/after the manufacturing process of the 3D object. Alternatively, the 3D object may be fabricated through different forming materials.

In view of the foregoing, it is an important issue for related practitioners to explore how to enable related structures to carry out coloring or switching operation on the forming materials smoothly in the printing process of 3D object without affecting the quality and efficiency of 3D printing.

SUMMARY

The disclosure is related to a printing module and a three-dimensional (3D) printing apparatus using the same, which use a movable latch on a base and a corresponding latching portion on a printing head assembly to achieve the effect of rapidly picking-and-placing different printing head assemblies by the means of driving a carriage assembly through a control module, thereby improving the printing capability and application range of the 3D printing apparatus.

According to the embodiment of the disclosure, a provided printing module is adapted to a 3D printing apparatus, wherein the 3D printing apparatus includes a frame and a control module. The frame has a printing area and a standby area. The printing module includes a carriage assembly, a first base, at least one fixing frame, at least one second base and at least one printing head assembly. The carriage assembly is disposed on the frame and electrically connected to the control module. The first base is disposed on the carriage assembly to be driven by the control module. The first base has a first latch movably disposed along a first axial direction. The fixing frame is disposed in the standby area, and has a first stopping portion and a second stopping portion arranged along the first axial direction. The second base is movably disposed in the standby area along the first axial direction and located between the first stopping portion and the second stopping portion. The second base has a second latch movably disposed along the first axial direction. The printing head assembly has a first latching portion and a second latching portion arranged along a second axial direction. The printing head assembly and the first base are adapted to move close to each other along the second axial direction such that the first latching portion drives the first latch to be locked with each other, or the printing head assembly and the second base are moved close to each other along the second axial direction such that the second latching portion drives the second latch to be locked with each other. The printing head assembly and the first base that are locked with each other are adapted to move along the first axial direction and abut against the first stopping portion to drive the first latch to release the first latching portion, or the printing head assembly and the second base that are locked with each other are adapted to be moved along the first axial direction and abut against the second stopping portion to drive the second latch to release the second latching portion.

According to an embodiment of the disclosure, a 3D printing apparatus includes a frame, a control module, a carriage assembly, a first base, at least one second base and at least one printing head assembly. The frame has a printing area and a standby area. The carriage assembly is disposed on the frame and electrically connected to the control module. The first base is disposed on the carriage assembly. The control module drives the first base through the carriage assembly. The second base is disposed in the standby area. The printing head assembly is detachably assembled on the first base or the second base. The printing head assembly includes a printing head and a heater, and electrically connected to the control module. A solid-state forming material is adapted to be introduced into the printing head to be heated by the heater to become a liquid-state forming material and extruded from the printing head. The control module makes the first base to move back and forth between the printing area and the standby area through the carriage assembly to pick-and-place the printing head assembly from/on the second base. When the printing head is carried on the first base or the second base, the heater continues to perform heating on the forming material.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

Figure 1:
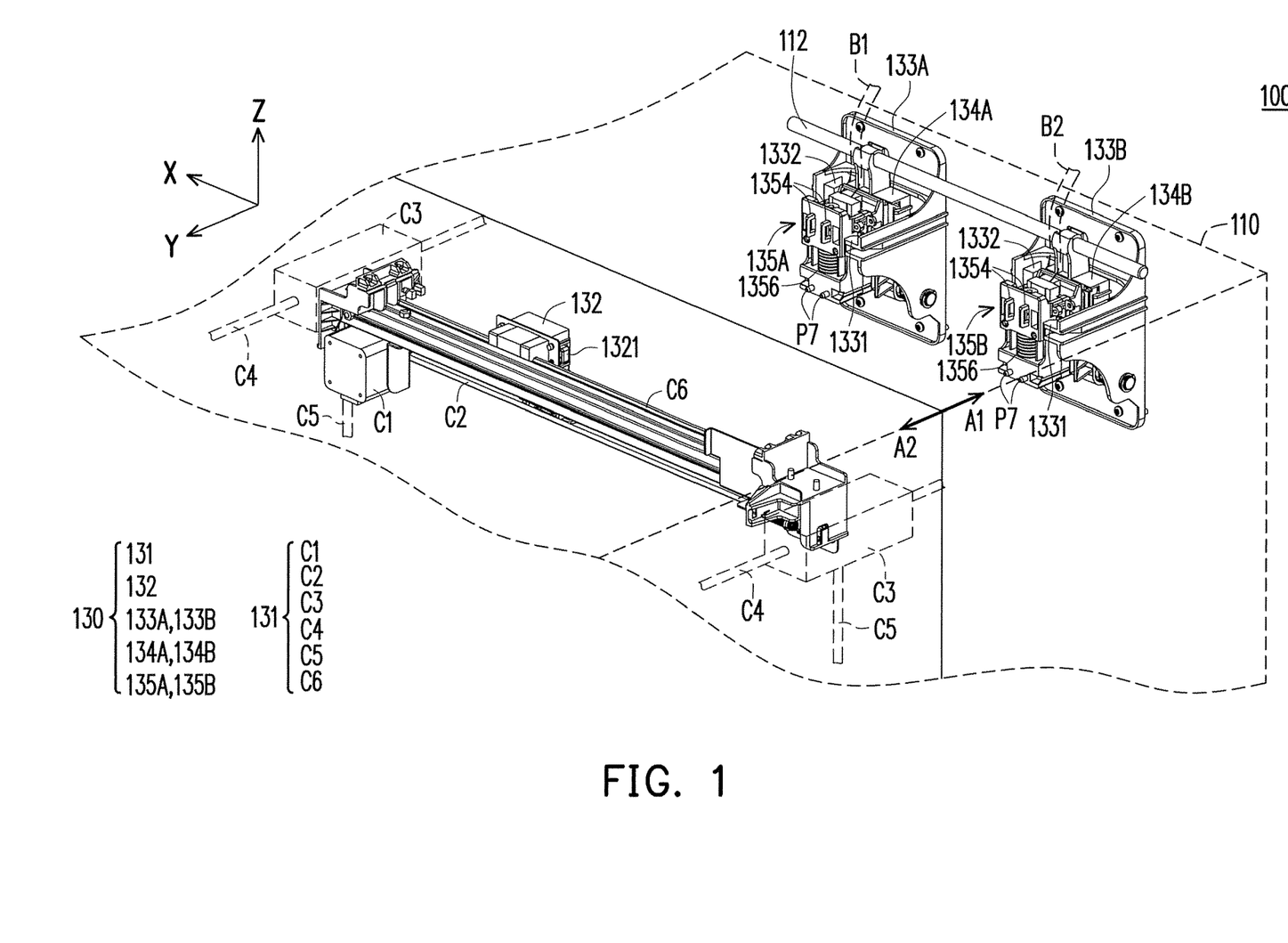
FIG. 1 is a schematic view illustrating a partial portion of a 3D printing apparatus according to an embodiment of the disclosure.
Figure 2A:
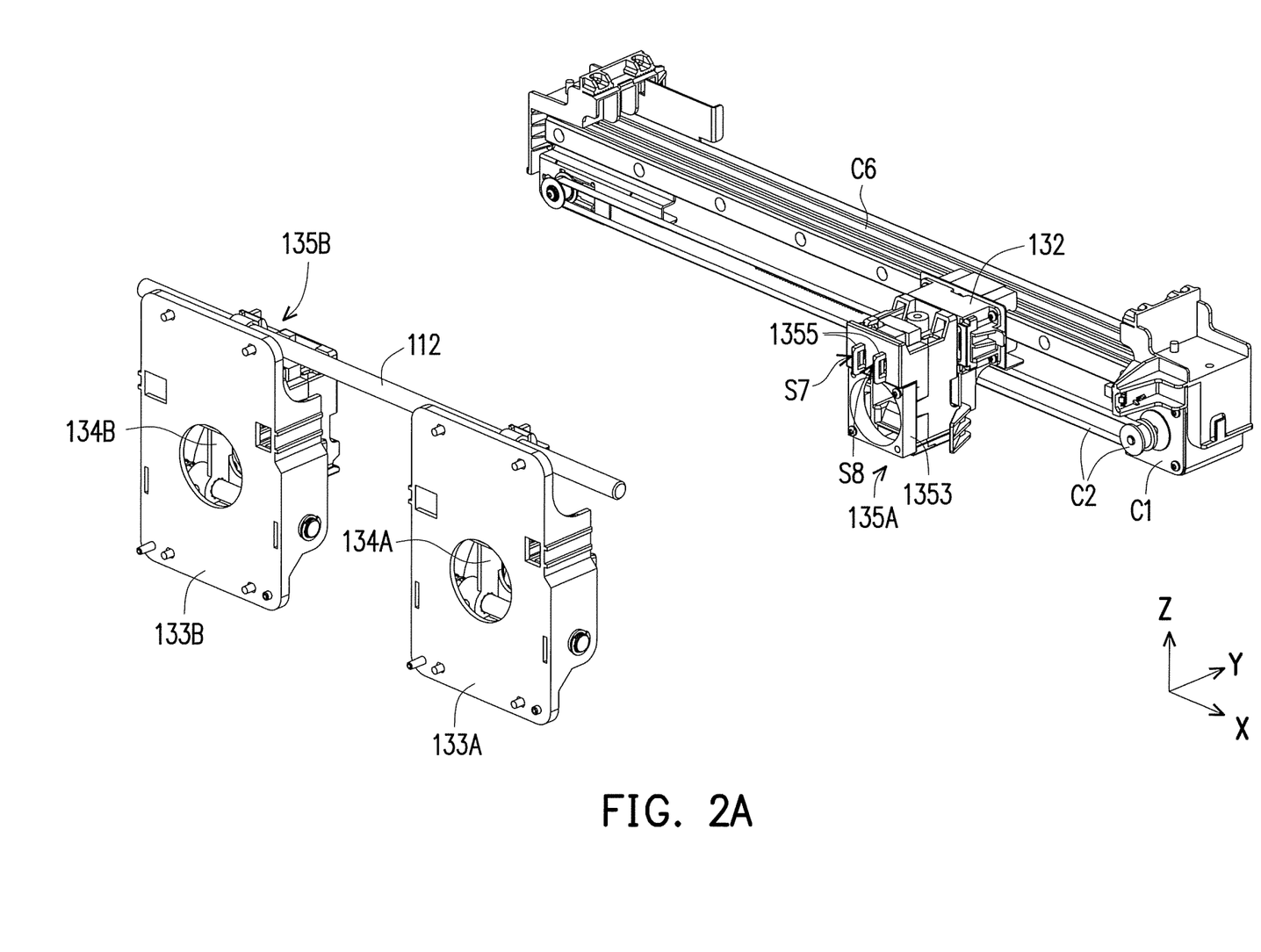
FIG. 2A and FIG. 2B respectively illustrate another state of the 3D printing apparatus in FIG. 1 in different viewing angles.
Figure 2B:
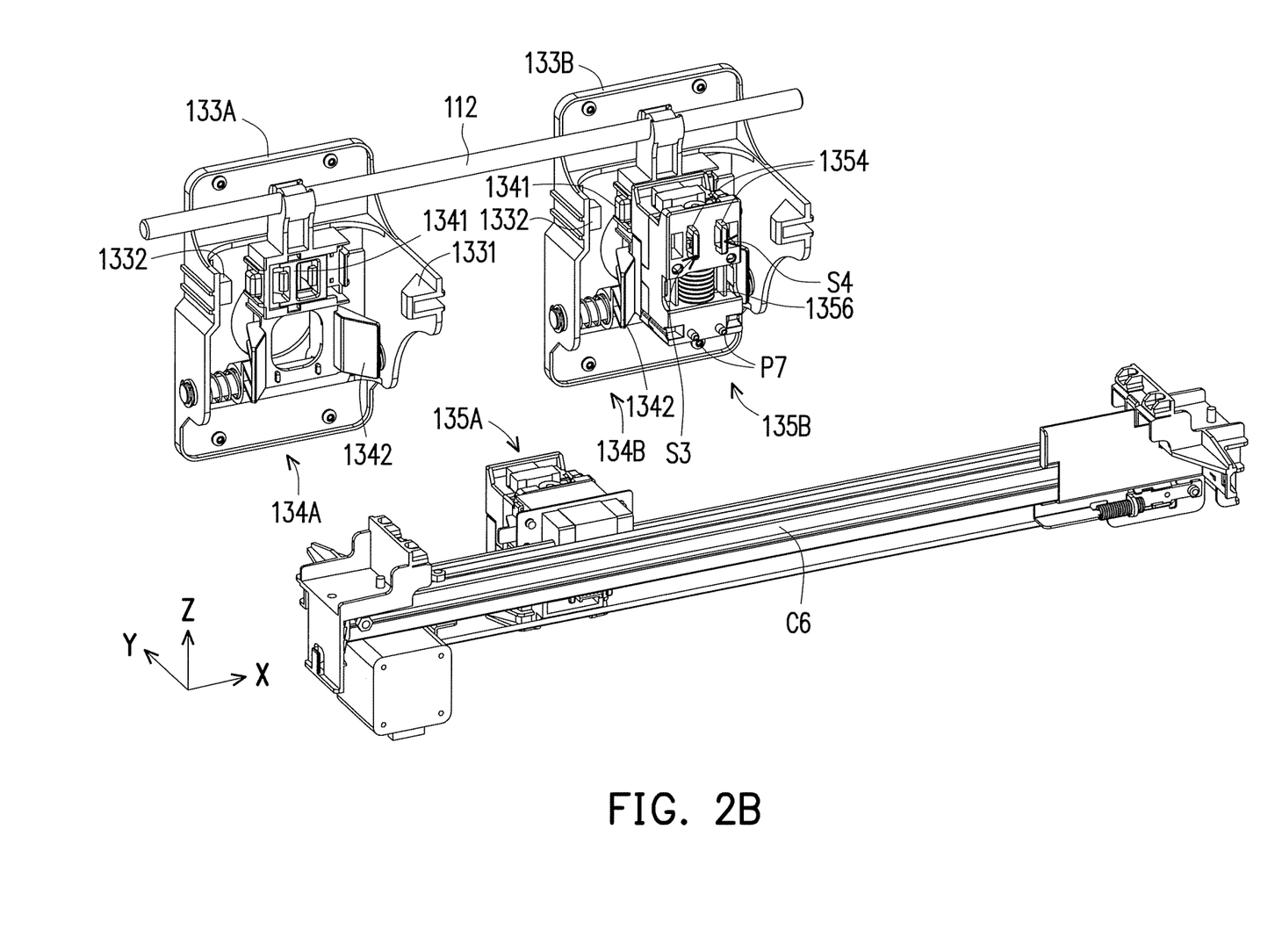
Figure 3:
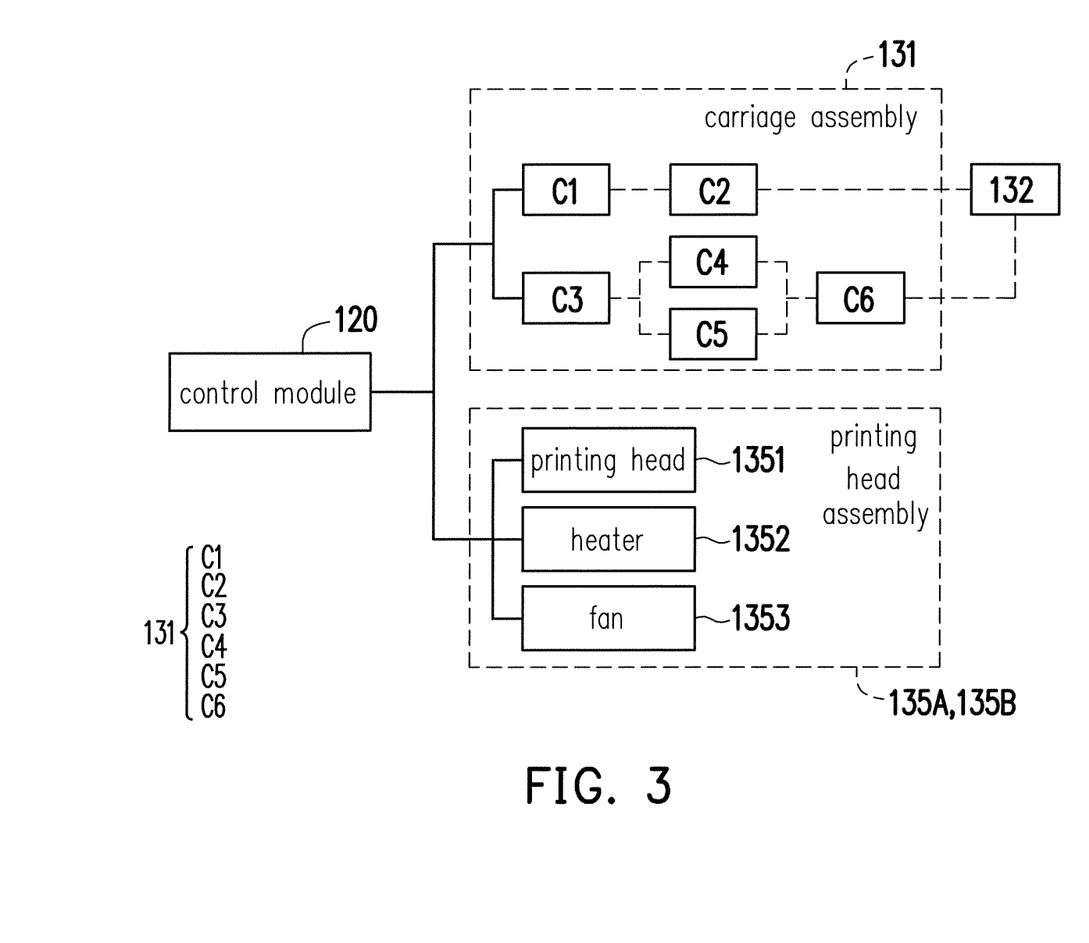
FIG. 3 is a diagram illustrating connection relationship between related components in FIG. 1, FIG. 2A and FIG. 2B.

FIG. 1 is a schematic view illustrating a partial portion of a 3D printing apparatus according to an embodiment of the disclosure. FIG. 2A and FIG. 2B respectively illustrate another state of the 3D printing apparatus in FIG. 1 in different viewing angles. FIG. 3 is a diagram illustrating connection relationship between related components in FIG. 1, FIG. 2A and FIG. 2B, wherein solid lines represent electrical connection relationship, and dashed lines represent structural connection relationship. Meanwhile, a Cartesian coordinate X-Y-Z is provided to facilitate description of component. Referring to FIG. 1 to FIG. 3, in the embodiment, a 3D printing apparatus 100 is exemplified as being formed by the means of fused deposition modeling (FDM), which is a method through which various thermally-fused line-like (stripe-like) materials (wax, ABS, nylon and the like, hereafter referred to as "forming material" in general) are heated and melted for modeling.

The 3D printing apparatus 100 includes a frame 110, a control module 120 and a printing module 130, wherein the frame 110 is divided into a printing area A2 and a standby area A1. The printing module 130 includes a carriage assembly 131, a first base 132, at least one fixing frame (two fixing frames 133A and 133B are provided here as an example, but the disclosure is not limited thereto), at least one second base (two bases 134A and 134B are provided here as an example, but the disclosure is not limited thereto) and at least one printing head assembly (two printing head assemblies 135A and 135B are provided here as an example, but the disclosure is not limited thereto). Specifically, the carriage assembly 131 is disposed on the frame 110 and electrically connected to the control module 120. The first base 132 is disposed on the carriage assembly 131 such that the control module 120 drives the first base 132 to move between the printing area A2 and the standby area A1 through the carriage assembly 131. The fixing frames 133A and 133B are disposed in the standby area A1 of the frame 110, and the second bases 134A and 134B are movably disposed on the frame 110 and respectively correspond to the fixing frames 133A and 133B. The printing head assemblies 135A and 135B are detachably assembled on the first base 132 or the second bases 134A and 134B and electrically connected to the control module 120 through cables B1 and B2 (shown in FIG. 1) respectively.

Specifically, the carriage assembly 131 is disposed on the frame 110 and electrically connected to the control module 120. Here, the carriage assembly 131 includes parts C1-C6, wherein the part C6 is, for example, a track which allows the first base 132 to be slidably disposed thereon. The part C1 is, for example, a motor which is electrically connected to the control module 120. The part C2 is, for example, a belt wheel structure which enables the first base 132 to be combined with the belt of the part C2. Therefore, the control module 120 can drive the first base 132 to move on the part C6 along the X-axis through parts C1 and C2. Moreover, the part C6 is able to move on the parts C4 and C5 through the part C3 (which is, for example, a driving motor set), wherein the part C3 is electrically connected to the control module 120, thereby further driving the first base 132 to move along Y and Z axis through the cooperation between the parts C3-C5. In this manner, the control module 120 can smoothly drive the first base 132 to perform three-dimensional movement within the frame 110 through the carriage assembly 131. However, the embodiment provides no limitation to each part of the carriage assembly 131. All existing technologies that can drive the first base 132 to perform the 3D movement are applicable to the embodiment. With the movement mode of the carriage assembly 131, the printing head assemblies 135A and 135B can be detached between the first base 132 and the second bases 134A and 134B appropriately to enable the printing head assembly 135A or 135B assembled on the first base 132 to perform printing or coloring operation in the printing area A2. Also, as shown in FIG. 2A and FIG. 2B, once it is necessary to replace the printing head assembly 135A, the control module 120 can drive the base 132 to the second bases 134A and 134B in the standby area A1 again through the carriage assembly 131 to reload the printing head assembly 135A or 135B from the first base 132 and place the printing head assembly 135A or 135B on the second base 134A in the empty state, and then to pick the required printing head assembly 135B from the other second base 134B and move back to the printing area A2 to continue the above-mentioned printing or coloring operation.

Figure 4A:
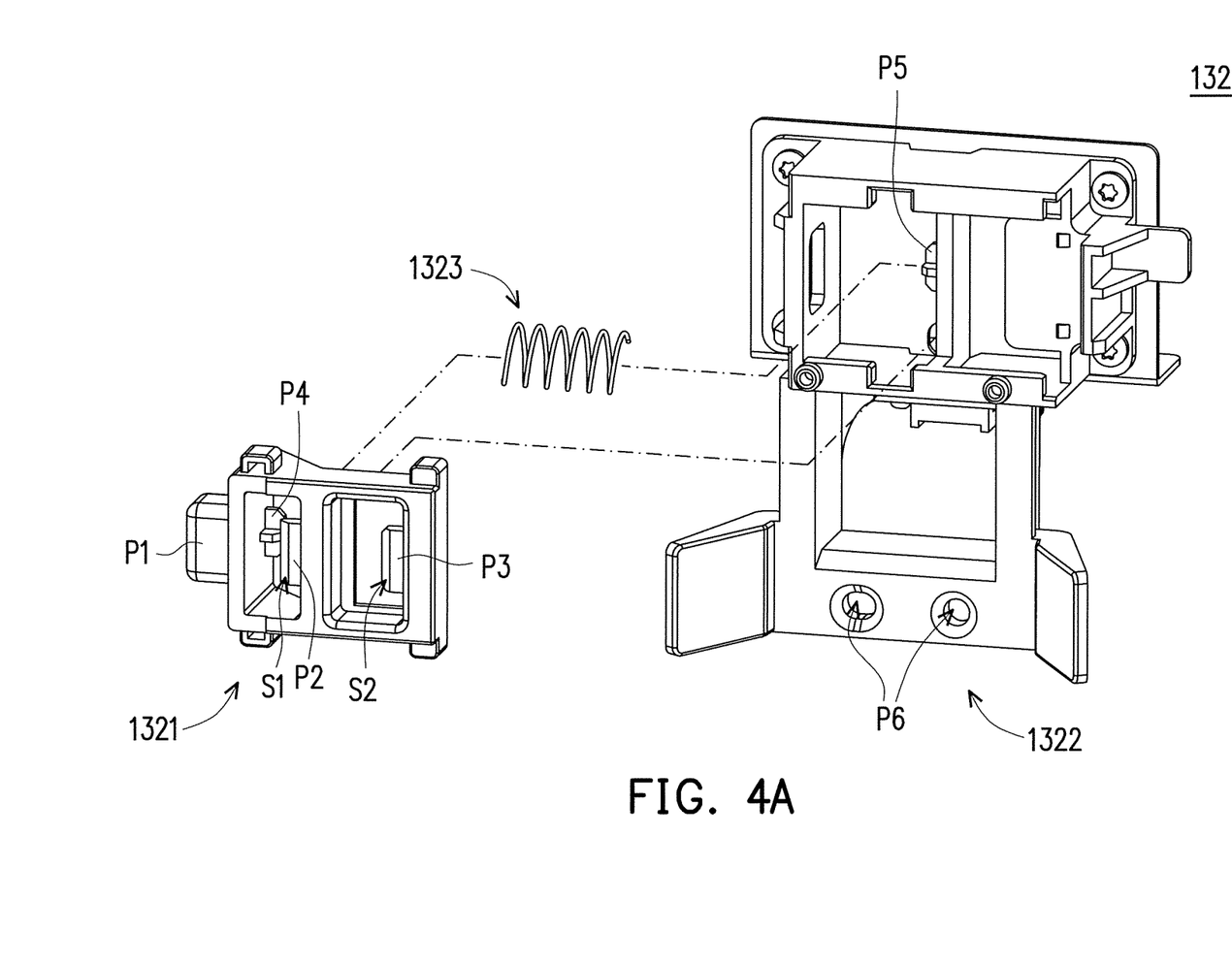
FIG. 4A is a schematic view illustrating assembling a first base.
Figure 4B:
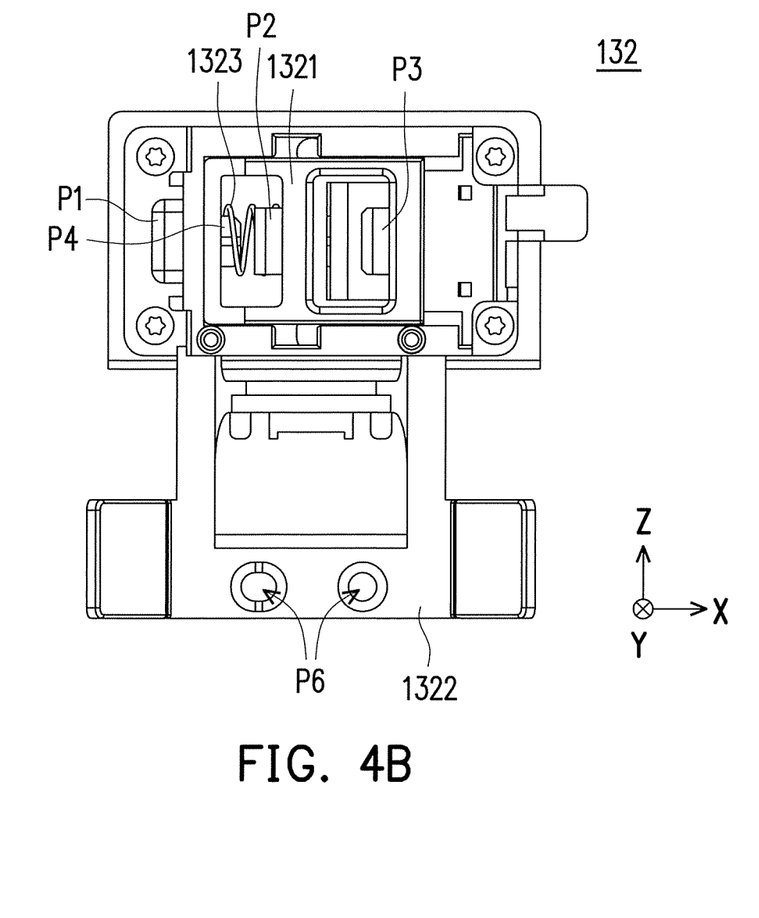
FIG. 4B is a front view of a first base.
Figure 5:
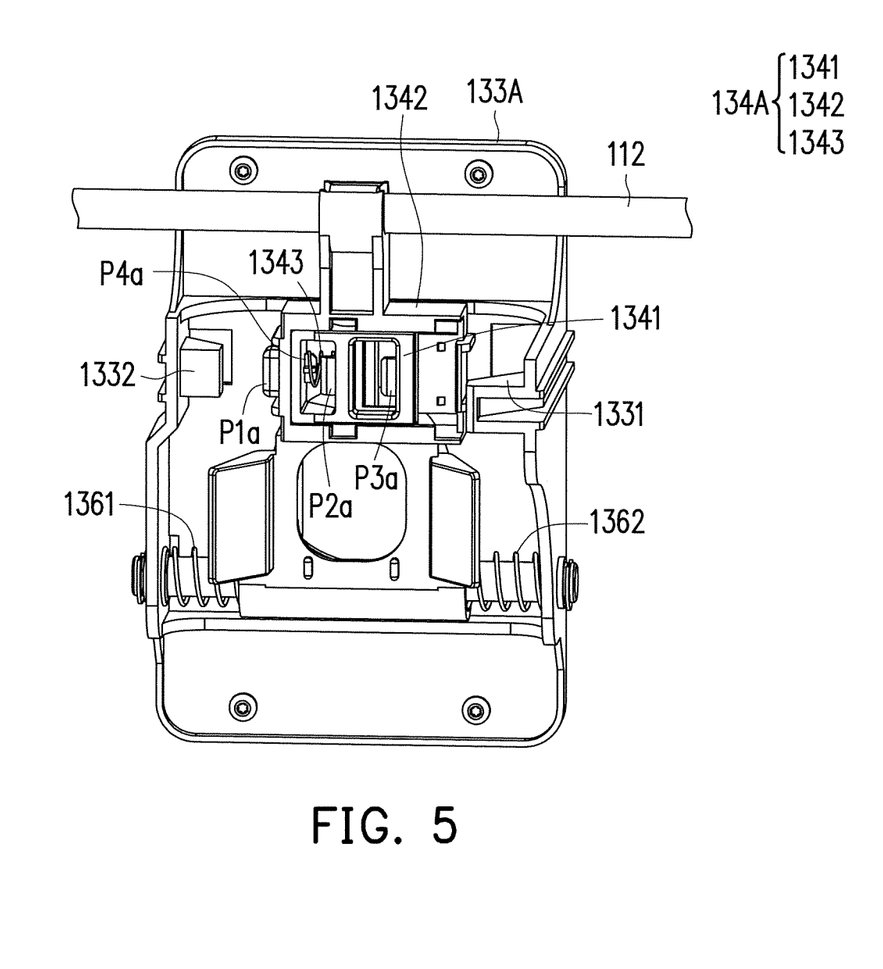
FIG. 5 is a schematic view of one of a fixing frame and a second base.
Figure 6A:
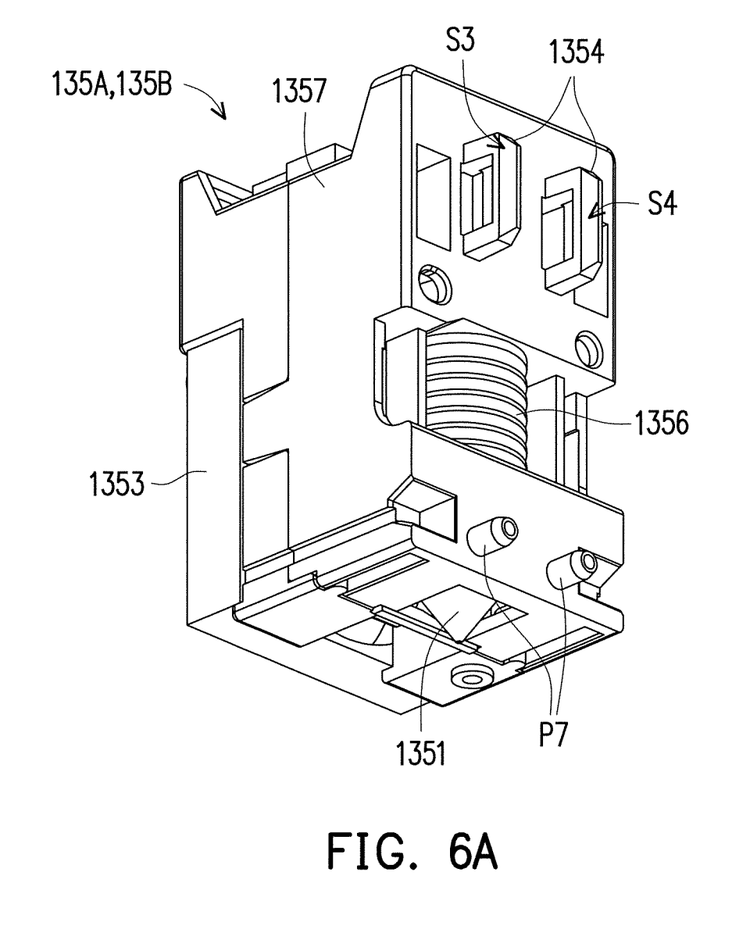
FIG. 6A and FIG. 6B respectively illustrate a printing head assembly in different viewing angles.
Figure 6B:
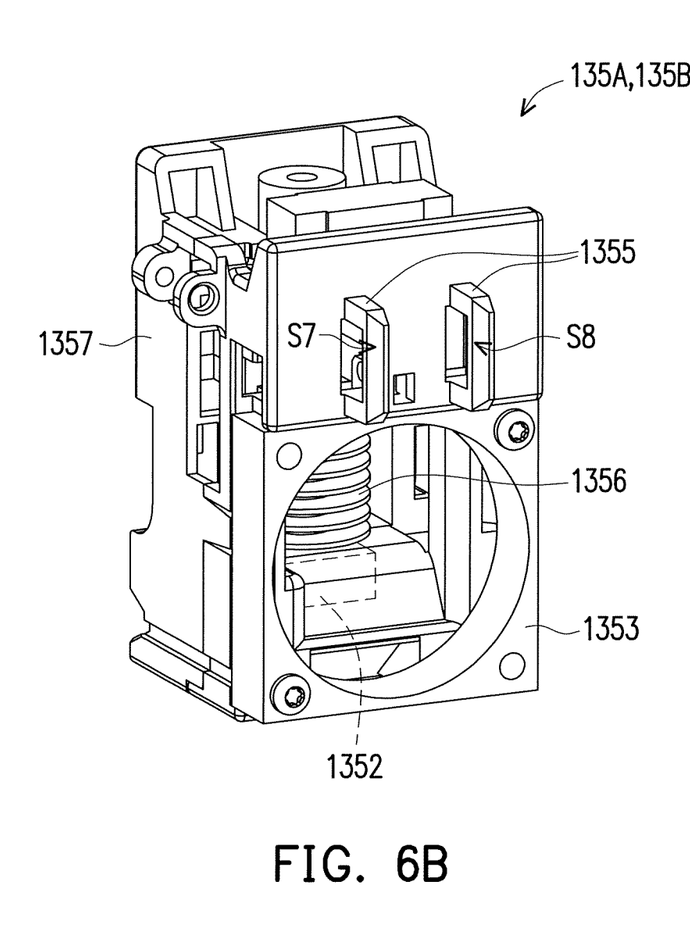

FIG. 4A is a schematic view illustrating assembling a first base. FIG. 4B is a front view of a first base. FIG. 5 is a schematic view of one of a fixing frame and a second base. FIG. 6A and FIG. 6B respectively illustrate a printing head assembly in different viewing angles. Referring to FIG. 4A to FIG. 6B, in comparison with FIG. 1, in order to easily pick-and-place the printing head assemblies 135A and 135B between the first base 132 and the second bases 134A and 134B, the first base 132 in the embodiment has a first latch 1321 movably disposed along the X-axis (corresponding to the state shown in FIG. 1). The fixing frames 133A and 133B each has a first stopping portion 1331 and a second stopping portion 1332 arranged along the X-axis, and the second bases 134A and 134B are respectively disposed slidably on a sliding bar 112 of the frame 110 to slide along the X-axis. Furthermore, the second bases 134A and 134B respectively correspond to the fixing frames 133A and 133B and each is disposed between the first stopping portion 1331 and the second stopping portion 1332. Moreover, the second bases 134A and 134B each has a second latch 1341 movably disposed along the X-axis. The printing head assemblies 135A and 135B each has a first latching portion 1354 and a second latching portion 1355 disposed along Y-axis, wherein the first latching portion 1354 is disposed to correspond to the first base 132, and the second latching portion 1355 is disposed to correspond to the second bases 134A and 134B.

Specifically, referring to FIG. 4A and FIG. 4B, the first base 132 includes a base body 1322, a first elastic element 1323 and the above-mentioned first latch 1321, wherein the first base body 1322 is assembled on the carriage assembly 131. The first latch 1321 is movably disposed within the first base body 1322 along the X-axis, and the first latch 1321 has a protrusion P1 movably passes through the first base body 1322 along the X-axis. Two opposite ends of the first elastic element 1323 are respectively sleeved on a protrusion P4 of the first latch 1321 and a protrusion P5 of the first base body 1322, such that the first elastic element 1323 is able to be abutted between the first latch 1321 and the first base body 1322. Here, the first elastic element 1323 permanently drives the first latch 1321 so as to protrude the protrusion P1 out of the first base body 1322 as shown in FIG. 4B.

Referring to FIG. 5, take one of the second bases 134A as an example, and the other second base 134B is formed by the same component as the above-mentioned second base 134A; thus no descriptions with illustration of schematic view of assembling are incorporated herein. The second base 134A includes a second base body 1342, a second elastic element 1343, and the above-mentioned second latch 1341, wherein the second base body 1342 is slidably disposed on the sliding bar 112 through a top portion thereof, and the second latch 1341 is movably assembled in the second base body 1342. The second latch 1341 has protrusions P1a, P2a and P3a, and wherein the protrusion P1a movably passes through the second base body 1342, and the second elastic element 1343 is sleeved on the protrusion P4a to be abutted between the second base body 1342 and the second latch 1341. The second elastic element 1343 permanently drives the second latch 1341 so as to protrude the protrusion P1a out of the second base body 1342.

Referring to FIG. 6A and FIG. 6B, in the embodiment, the printing head assemblies 135A and 135B each includes a housing 1357, a printing head 1351, a heater 1352, a fan 1353, a first latching portion 1354, a second latching portion 1355 and a heat-dissipating fin 1356, wherein the printing head 1351 and the heater 1352 are disposed in the housing 1357 and electrically connected to the control module 120 through the above-mentioned cables B1 and B2. An upper end of the printing head 1351 is adapted to introduce a solid-state forming material, which becomes a liquid-state forming material after being heated by the heater 1352 and is extruded by a related driving element (not shown) of the printing head 1351. The heat-dissipating fin 1356 is disposed around the printing head 1351 and corresponds to the fan 1353 to facilitate the printing head 1351 to dissipate heat and prevent the temperature from getting too high. It should be noted that the first latching portion 1354 and the second latching portion 1355 are disposed on two opposite sides of the housing 1357, and thus respectively corresponding to the second bases 134A and 134B as well as the first base 132. Here, the first latching portion 1354 and the second latching portion 1355 are respectively formed as an annular lock structure to respectively correspond to the protrusions P2 and P3 of the first latch 1321 and the protrusions P2a and P3a of the second latch 1341.

In view of the foregoing, it can be derived that the constitution of the second bases 134A and 134B is substantially the same as the first base 132, which uses a movable latch (first latch 1321, second latch 1341) disposed in the base body to achieve the effect of locking the printing head assemblies 135A and 135B. The second bases 134A and 134B are different from the first base 132 in that the second bases 134A and 134B further have a corresponding relationship relative to the fixing frames 133A and 133B. As shown in FIG. 5, the printing module 130 further includes third elastic elements 1361 and 1362, which are respectively abutted between the fixing frames 133A and 133B as well as the second base body 1342 of the second bases 134A and 134B. The third elastic elements 1361 and 1362 permanently drive the second bases 134A and 134B to be moved to the predetermined position relative to the fixing frames 133A and 133B, as shown in FIG. 5, to move the second latch 1341 away from the second stopping portion 1332, and move the first latch 1321 away from the first stopping portion 1331. That is, the predetermined position substantially refers to the position where the second latch 1341 is not abutted against the second stopping portion 1332 and the first latch 1321 is not abutted against the first stopping portion 1331. Detailed descriptions in this regard are incorporated in the following paragraphs.

Based on the corresponding relationship as shown in FIG. 4A-FIG. 6B, the protrusions P2 and P3 of the first latch 1321 and the protrusions P2a and P3a of the second latch 1341 respectively correspond to the first latching portion 1354 and the second latching portion 1355 to generate a corresponding locking effect, which enables the printing head assemblies 135A and 135B to be assembled on the first base 132 or the second bases 134A and 134B. The following example describes the operation of picking-and-placing the printing head assemblies 135A and 135b between the first base 132 and the second base 134A.

Figure 7:
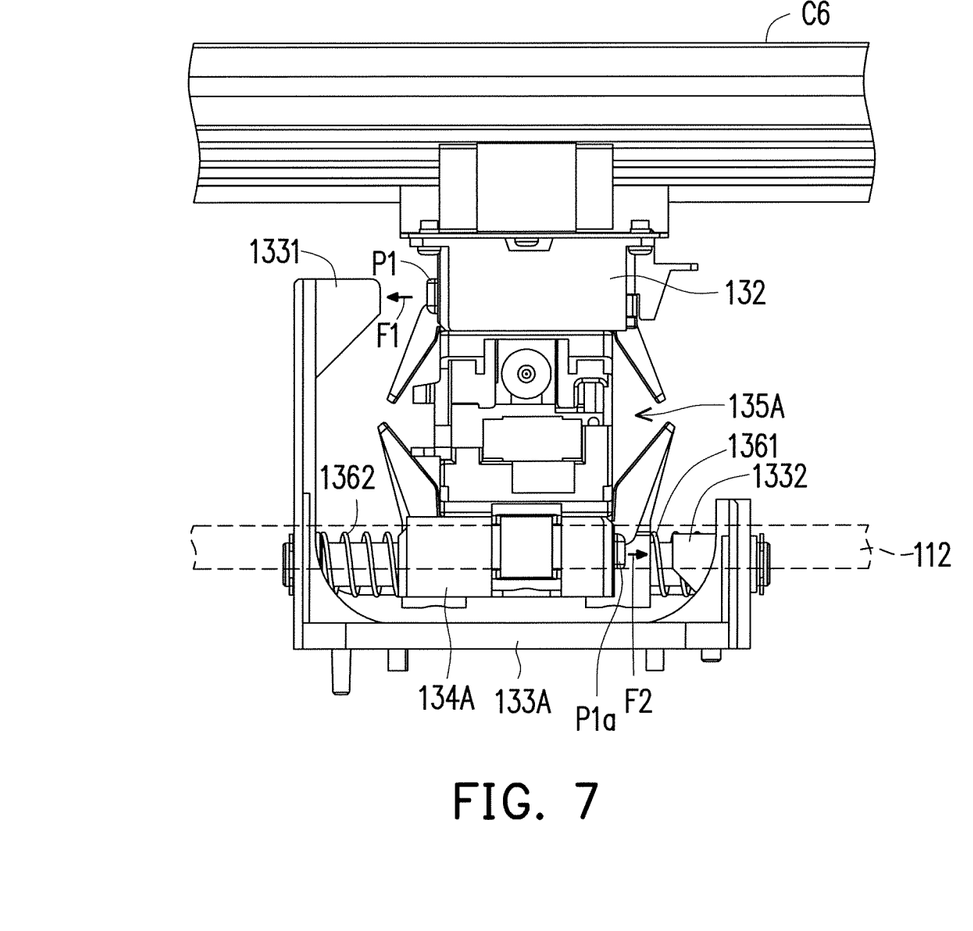
FIG. 7 is a schematic view illustrating assembling a first base, a second base and a printing head assembly.
Figure 8A:
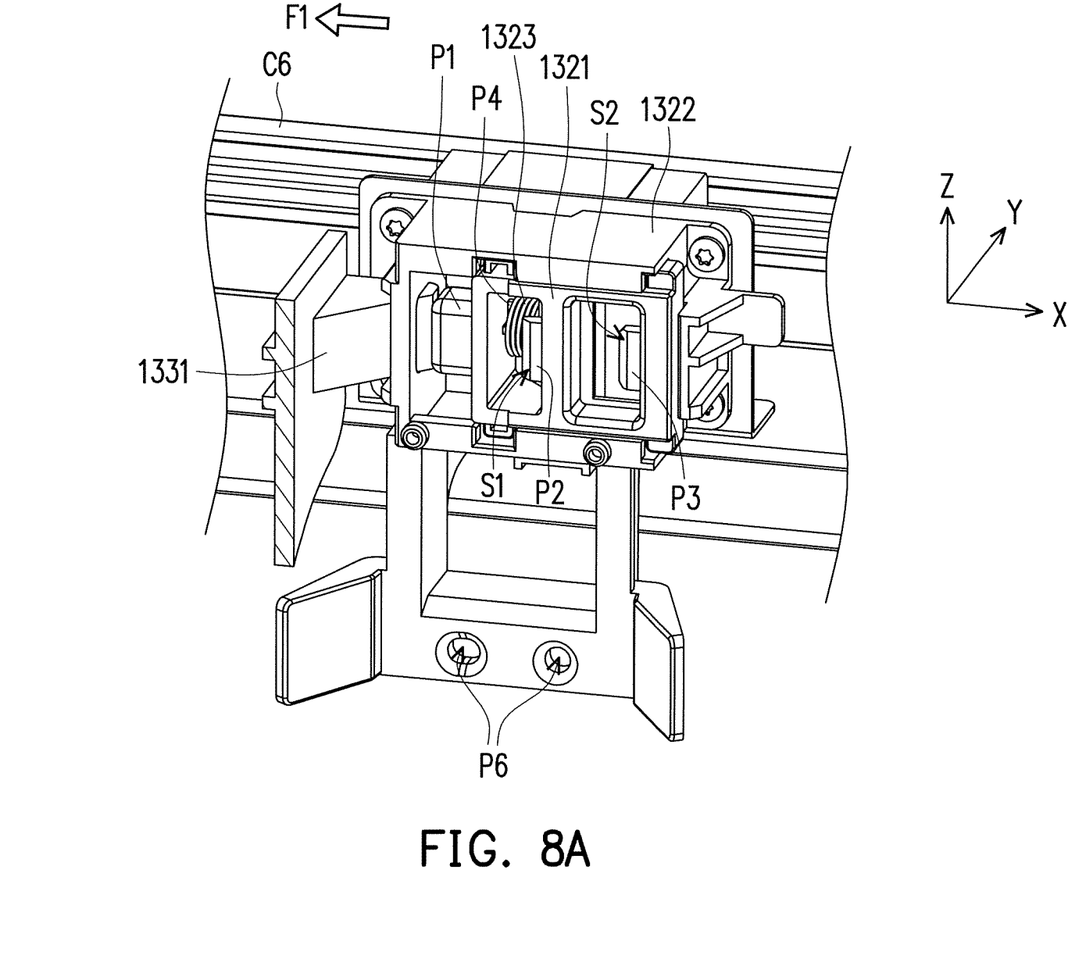
FIG. 8A and FIG. 8B respectively illustrate schematic views of operations between a fixing frame with a first base and a second base respectively.
Figure 8B:
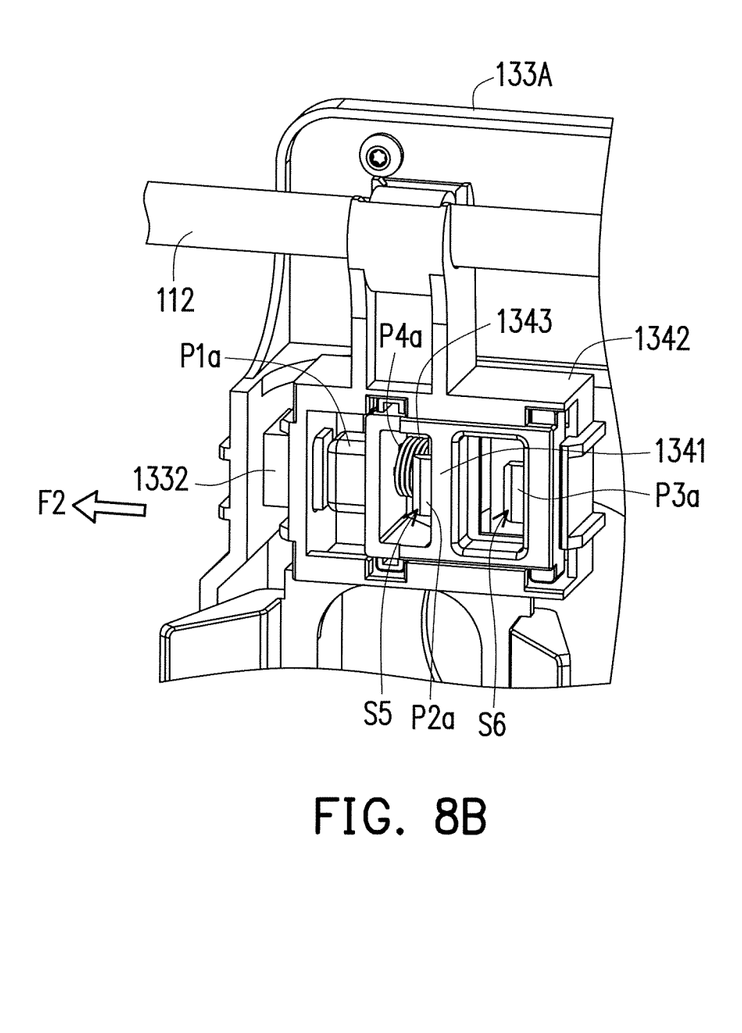

FIG. 7 is a schematic view illustrating assembling a first base, a second base and a printing head assembly. Here, a partial portion of the printing module is shown in a top viewing angle. FIG. 8A and FIG. 8B respectively illustrate schematic views of operations between a fixing frame with a first base and a second base respectively. Referring to FIG. 4A to FIG. 7, in the meantime, the illustration in FIG. 1 shows an initial state which serves a basis for the following descriptions in relation to operations. In the embodiment, the first base 132 in FIG. 1 is not provided with the printing head assembly yet, and the second bases 134A and 134B in the standby area A1 are respectively provided with the printing head assemblies 135A and 135B thereon. Therefore, to assemble the printing head assembly 135A on the first base 132, the control module 120 drives the first base 132 through the carriage assembly 131 along the Y-axis (as a negative Y-axis direction shown in FIG. 1) to move to the standby area A1 from the printing area A2 and move toward the second base 134A. First, it should be noted that, as shown in FIG. 6A and FIG. 6B, the first latch 1321 has protrusions P2 and P3 extended along the X-axis respectively, and guiding slopes S1 and S2 are provided thereon. In the meantime, the first latching portion 1354 of the printing head assembly 135 is extended along the Y-axis, and guiding slopes S3 and S4 are provided thereon. Therefore, in the process where the first base 132 is moved toward the printing head assembly 135A on the second base 134A, the guiding slopes S1 and S2 are correspondingly jointed to the guiding slopes S3 and S4, and since the guiding slopes S1-S4 are inclined relative to a moving axis (Y-axis), the first latching portion 1354 can smoothly push the first latch 1321 to move toward the positive X-axis direction in the process of moving along the Y-axis, such that the protrusion P1 of the first latch 1321 is retracted into the first base body 1322. Meanwhile, in FIG. 4B, the protrusions P2 and P3 are also shifted to the right (positive X-axis direction) from the current position. That is to say, the movement of the first base 132 toward the printing head assembly 135A (toward negative Y-axis direction) causes the first latch 1321 to move temporarily toward the positive X-axis, and deform (compress) the first elastic element 1323 in corresponding to the movement of the first latch 1321. In the meantime, the printing head assembly 135A further provides a joint positioning effect between the first base 132 and the printing head assembly 135A through the cooperation between a positioning pillar P7 and a positioning hole P6 on the first base 132.

Thereafter, as shown in FIG. 6A, since the first latching portion 1354 is an annular lock structure, which has a physical portion and a hollow portion, when the physical portion of the first latching portion 1354 is abutted against and passes through the protrusions P2 and P3, the protrusions P2 and P3 no longer have an interfering component in the negative X-axis direction. Accordingly, the elastic force of the first elastic element 1323 further drives the first latch 1321 to be restored (moved toward the negative X-axis direction), and makes the protrusions P2 and P3 to pass through the hollow portion of the first latching portion 1354; also, the protrusion P1 is protruded from the first base body 1322 again. In this manner, an interfering effect along the Y-axis is generated between the protrusions P2 and P3 of the first latch 1321 and the first latching portion 1354, thereby achieving the effect that the printing head assembly 135A and the first base 132 are locked with each other. As shown in FIG. 7, at this time, the first base 132, the printing head assembly 135A and the second base 134A are locked with each other along the Y-axis and exhibited as an integrated component.

In order to maintain the effect that the printing head assembly 135A is assembled on the first base 132, it is required to detach the printing head assembly 135A from the second base 134A. As described above, the second base 134A is slidably disposed on the sliding bar 112 in corresponding to the configuration of the fixing frame 133A. Therefore, in the embodiment, the control module 120 further drives the carriage assembly 131 to move along the X-axis (toward negative X-axis direction), such that the first base 132, the printing head assembly 135A and the second base 134A which are exhibited as an integrated component are simultaneously moved along an abutting path F2, and the second stopping portion 1332 of the fixing frame 133A is located right in the abutting path F2 of the integrated component. In this manner, as shown in FIG. 8B, the protrusion P1a of the second latch 1341 can be pushed away by the second stopping portion 1332 along the X-axis and retracted back to the second base body 1342 accordingly.

Referring to FIG. 5 and FIG. 8B, the description related to the latch and latching portion show that, when the protrusions P2a and P3a of the second latch 1341 are moved away from the position shown in FIG. 5 (moved to the position shown in FIG. 8B), the second latch 1341 is no longer interfered with the second latching portion 1355; that is, the second latching portion 1355 of the printing head assembly 135A no longer has any component that stops it from moving along the Y-axis (toward positive Y-axis direction), and thus the printing head assembly 135A and the second base 134A are in a removable state. Accordingly, in the state shown in FIG. 8B, the control module 120 can further drive the first base 132 and the printing head assembly 135A to move toward the positive Y-axis through the carriage assembly 131 to be moved away from the second base 134A, thereby completing the process of assembling the printing head assembly 135A on the first base 132 and picked from the second base 134A. Additionally, as shown in the descriptions regarding the component in FIG. 5, when the second base 134A is moved to the second stopping portion 1332 as shown in FIG. 8B, it also causes the third elastic element 1361 to be deformed (compressed) and the third elastic element 1362 to be deformed (stretched). Accordingly, when the printing head assembly 135A is moved away from the second base 134A along with the first base 132, the second base 134A in a free state is moved away from the second stopping portion 1332 due to the elastic force of the third elastic elements 1361 and 1362, thereby achieving the restoring effect. In this manner, the printing module 130 of the 3D printing apparatus 100 is in the state as shown in FIG. 2A and FIG. 2B. The control module 120 is able to drive the first base 132 and the printing head assembly 135A thereon through the carriage assembly 131 to complete the required printing or coloring operation in the printing area A2.

Next, when the printing head assembly 135 needs to be replaced by the printing head assembly 135B, it is required to place the printing head assembly 135A back to the second base 134A. At this time, the control module 120 drives the first base 132 and the printing head assembly 135A thereon to move to the standby area A1 first and then move to the second base 134A. As mentioned above, the second base 134A has the same constitution as the first base 132; therefore, the second base 134A can also make the printing head assembly 135A and the second latch 1341 of the second base 134A to complete the locking action through movement along the Y-axis. Likewise, after locking, the first base 132, the printing head assembly 135A and the second base 134A are formed as an integrated component; no further descriptions concerning the locking process are incorporated herein. The difference is that, referring to FIG. 7A and FIG. 8A, at this time, it is necessary to release the locking relationship between the first base 132 and the printing head assembly 135A such that the printing head assembly 135A goes back to the second base 134A again. Therefore, the control module 120 drives the integrated component to move along an abutting path F1 (toward positive X-axis direction) through the carriage assembly 131. Since the first stopping portion 1331 of the fixing frame 133A is disposed in the moving path of the first latch 1321, as shown in FIG. 8A, the protrusion P1 of the first latch 1321 is pushed away by the first stopping portion 1331 to retract back to the first base body 1322, thereby smoothly releasing the interfering relationship between the first latch 1321 and the first latching portion 1354. Until then, the control module 120 can then drive the first base 132 to move away from the printing head assembly 135A smoothly, thereby achieving the effect of placing the printing head assembly 135A on the second base 134A while being released from the first base 132.

Thereafter, as in the process where the first base 132 and the printing head assembly 135A are combined, at this time, the control module 120 moves the first base 132 to the second base 134B in the standby area A1 in the same manner to perform the required picking-and-placing operation on the printing head assembly 135B; thus, no repetition is incorporated herein. Until then, the process of replacing the printing head assembly (changed from 135A to 135B) is completed.

It should be further noted that, the embodiment provides no limitation to the number of the second base and the printing head assembly. In other embodiment that is not shown, the 3D printing apparatus may be provided with a plurality of second bases and a plurality of printing head assemblies, which can also achieve the same picking-and-placing effect through the above-mentioned structure. In the meantime, such configuration also improves the 3D printing or coloring capability of the 3D printing apparatus and facilitates to increase application range thereof.

Additionally, in another embodiment that is not shown, the form of the first latching portion 1354 and the first latch 1321 may be designed in a reversed manner; that is, the first latching portion is changed into a protruded structure, and the first latch is changed into an annular lock structure, which can also achieve the same interfering locking effect as described above.

On the other hand, referring to FIG. 1 and FIG. 2A, as described above, the printing head assemblies 135A and 135B are electrically connected to the control module 120 through cables B1 and B2. More specifically, the printing head 1351 of the printing head assemblies 135A and 135B, the heater 1352 and the fan 1353 can be electrically connected to the control module 120 accordingly. In this manner, no matter where the printing head assemblies 135A and 135B are located in the frame 110, the control module 120 can perform heating on the forming material in the printing head 1351 through the heater 1352. For example, when the printing head assembly 135A is disposed on the first base 132, and the printing head assembly 135B is disposed on the second base 134B, the control module 120 drives the printing head assembly 135A on the first base 132, such that the heater 1352 heats up the solid-state forming material to a melting temperature (i.e., the printing head assembly 135A is at the printing temperature) to facilitate the 3D printing operation. In the meantime, the control module 120 may drive the heater 1352 of the printing head assembly 135B on the second base 134B to heat up the solid-state forming material to a softening temperature (i.e., the printing head assembly 135B is at the standby temperature) without causing the forming material to melt. Subsequently, when the printing head assembly 135B is to be assembled on the first base 132 to perform 3D printing, since the printing head assembly 135B is at the standby temperature and does not become cool, the control module 120 is able to drive the heater 1352 with lower energy to allow the forming material to reach the melting temperature for performing 3D printing operation, thereby saving the reactivating process required for replacing the printing head assembly. In other words, for the printing head assemblies 135A and 135B in the embodiment, the heater 1352 can continuously perform heating on the printing head 1351 no matter in the printing area A2 or the standby area A1.

In continuation of the above, it should be noted that when the heater 1352 is activated, it actually performs heating operation continuously. In order to maintain the temperature range required for the forming material in the printing head 1351, the 3D printing apparatus 100 in the embodiment uses the fan 1353 to dissipate heat. As described above, since the fan 1353 is moved in the frame 110 along with the printing head assemblies 135A and 135B, it can be regarded as that the heater can provide the heat-dissipating effect on the heat-dissipating fin 1356 no matter where the printing head assemblies 135A and 135B are located in the frame 110.

In summary of the above, the 3D printing apparatus provides the corresponding locking structure on the first base, the second base and the printing head assembly while providing a corresponding stopping structure on the second base, such that the control module is able to drive the first base to move back and forth between the printing area and the standby area through the carriage assembly, thereby pushing the printing head assembly to be picked-and-placed relative to the first base and the second base. Furthermore, the control module uses the driving mode applied by the carriage assembly on the first base, which can further be applied to picking-and-placing action between the printing head assembly and the second base while achieving the picking-and-placing action between the first base and the printing head assembly. In this manner, the required replacing operation can be completed without disposing additional driving component for replacing the printing head assembly in the frame or perform the disassembling operation by labor. Accordingly, the 3D printing apparatus is able to replace the required printing head assembly with simple structural configuration, thereby effectively improving 3D printing or coloring capability of the 3D printing apparatus and increasing the application range thereof.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A printing module adapted for a 3D printing apparatus, wherein the 3D printing apparatus comprises a frame and a control module, the frame has a printing area and a standby area, the printing module comprising:

a carriage assembly, disposed on the frame and electrically connected to the control module;

a first base, disposed on the carriage assembly, the control module driving the first base through the carriage assembly between the printing area and the standby area, the first base having a first latch moving along a first axial direction;

at least a fixing frame, disposed in the standby area, the fixing frame having a first stopping portion and a second stopping portion arranged along the first axial direction;

at least a second base, movably disposed in the standby area along the first axial direction, and located between the first stopping portion and the second stopping portion along the first axial direction, the second base having a second latch moving along the first axial direction; and at least a printing head assembly, having a first latching portion and a second latching portion disposed along a second axial direction that transverses the first axial direction, wherein the printing head assembly and the first base are adapted to move close to each other along the second axial direction, such that the first latching portion drives the first latch to be locked with each other, or the printing head assembly and the second base are moved close to each other along the second axial direction such that the second latching portion drives the second latch to be locked with each other, wherein the printing head assembly and the first base locked with each other are adapted to move along the first axial direction and abutted against the first stopping portion to drive the first latch to release the first latching portion, or the printing head assembly and the second base locked with each other are adapted to move along the first axial direction and abutted against the second stopping portion to drive the second latch to release the second latching portion, the first base comprises:

a first base body, assembled on the carriage assembly, the first latch movably assembled in the first base body, wherein the first latch has a first protrusion extending in the first axial direction and movably passing through the first base body along the first axial direction, the first stopping portion is located in a moving path of the first protrusion, the first base body has a wall formed with an opening, when the printing head assembly and the first base locked with each other are abutted against the first stopping portion, the first protrusion is pushed away by the first stopping portion to retract back to the first base body through the opening; and a first elastic element, extending in the first axial direction and abutted between the first base body and the first latch, the first elastic element permanently driving the first latch so as to protrude the first protrusion to penetrate through the opening in the first axial direction and out of the first base body, wherein a distance between the first base and the first stopping portion in the second axial direction is smaller than a distance between the first base and the second stopping portion in the second axial direction.

2. The printing module as claimed in claim 1, wherein the first stopping portion and the second stopping portion are disposed in a front-and-back manner along the second axial direction.

3. The printing module as claimed in claim 1, wherein at least one of the first latching portion and the first latch has a guiding slope, the guiding slope is inclined relative to the second axial direction, at least one of the second latching portion and the second latch has another guiding slope, said another guiding slope is inclined relative to the second axial direction.

4. The printing module as claimed in claim 1, wherein the first axial direction is orthogonal to the second axial direction.

5. The printing module as claimed in claim 1, wherein the second base comprises:

a second base body, slidably disposed on a sliding bar of the frame, the second latch movably assembled in the second base body, wherein the second latch has a second protrusion movably passing through the second base body along the first axial direction, the second stopping portion is located in a moving path of the second protrusion; and a second elastic element, abutted between the second base body and the second latch, the second elastic element permanently driving the second latch so as to protrude the second protrusion out of the second base body.

6. The printing module as claimed in claim 5, further comprising:

a third elastic element, abutted between the fixing frame and the second base, the third elastic element permanently driving the second base to move to a predetermined position relative to the fixing frame, such that the first latch is moved away from the first stopping portion, and the second latch is moved away from the second stopping portion.

7. The printing module as claimed in claim 1, wherein the printing head assembly is adapted to lock the first base by the first latching portion and lock the second base by the second latching portion, the control module simultaneously drives the first base, the printing head assembly and the second base to move along the first axial direction through the carriage assembly.

8. The printing module as claimed in claim 1, wherein the printing module comprises a plurality of second bases and a plurality of printing head assemblies, the printing head assemblies are detachably disposed on the second bases, the control module makes the first base to move back and forth between the printing area and the standby area through the carriage assembly to pick-and-place the plurality of printing head assemblies in turn.

9. A 3D printing apparatus, comprising:

a frame, having a printing area and a standby area;

a control module;

a carriage assembly, disposed on the frame and electrically connected to the control module;

a first base, disposed on the carriage assembly, the control module driving the first base through the carriage assembly between the printing area and the standby area;

at least a fixing frame, disposed in the standby area, the fixing frame having a first stopping portion and a second stopping portion arranged along a first axial direction;

at least a second base, disposed in the standby area; and at least a printing head assembly, detachably assembled on the first base or the second base, the printing head assembly comprising a printing head and a heater, the heater electrically connected to the control module, a solid-state forming material adapted to be introduced into the printing head and extruded from the printing head after being heated by the heater to become a liquid-state forming material, the control module making the first base to move back and forth between the printing area and the standby area through the carriage assembly to pick-and-place the printing head assembly from/on the second base, wherein when the printing head assembly is carried on the first base or the second base, the heater performs heating on the forming material continuously, wherein the printing head assembly and the first base are adapted to move close to each other along a second axial direction that transverses the first axial direction, and a distance between the first base and the first stopping portion in the second axial direction is smaller than a distance between the first base and the second stopping portion in the second axial direction.

10. The 3D printing apparatus as claimed in claim 9, further comprising a cable, an end of the cable being electrically connected to the heater and the printing head, another end of the cable being electrically connected to the control module.

11. The 3D printing apparatus as claimed in claim 9, further comprising a fan, assembled on the printing head assembly and electrically connected to the control module.

12. The 3D printing apparatus as claimed in claim 9, wherein the 3D printing apparatus comprises a plurality of second bases, a plurality of printing head assemblies and a plurality of cables, the printing head assembly is detachably disposed on the second base, the control module makes the first base to move back and forth between the printing area and the standby area through the carriage assembly to pick-and-place the plurality of printing head assemblies in turn, the plurality of printing head assemblies are electrically connected to the control module through the plurality of cables respectively.

* * * * *